United States Patent [19]

Adamache

[11] Patent Number: 4,467,868

[45] Date of Patent: Aug. 28, 1984

[54] ENHANCED OIL RECOVERY BY A MISCIBILITY ENHANCING PROCESS

[75] Inventor: Ion Adamache, Calgary, Canada

[73] Assignee: Canterra Energy Ltd., Canada

[21] Appl. No.: 354,475

[22] Filed: Mar. 3, 1982

Related U.S. Application Data

[63] Continuation-in-part of Ser. No. 192,563, Sep. 30, 1980, abandoned.

[30] Foreign Application Priority Data

Oct. 5, 1979 [CA] Canada ................................ 337091

[51] Int. Cl.³ ............................................... E21B 43/22
[52] U.S. Cl. ...................................... 166/263; 166/273
[58] Field of Search ............... 166/252, 263, 273, 274, 166/305 R; 252/8.55 D

[56] References Cited

U.S. PATENT DOCUMENTS

| | | | |
|---|---|---|---|
| 2,867,277 | 1/1959 | Weinaug et al. | 166/273 |
| 2,968,350 | 1/1961 | Slobod et al. | 166/273 |
| 3,035,637 | 5/1962 | Allen | 166/273 |
| 3,084,744 | 4/1963 | Dew et al. | 166/273 |
| 3,123,136 | 3/1964 | Sharp | 166/273 |
| 3,147,803 | 9/1964 | Reed et al. | 166/273 |
| 3,157,230 | 11/1964 | Connally, Jr. et al. | 166/274 |
| 3,203,481 | 8/1965 | Dew et al. | 166/273 |
| 3,209,824 | 10/1965 | Koch, Jr. et al. | 166/274 X |
| 3,223,157 | 12/1965 | Lacey et al. | 166/273 X |
| 3,330,342 | 7/1967 | Holm | 166/273 X |
| 3,616,854 | 11/1971 | Braden, Jr. | 166/273 X |
| 3,811,502 | 5/1974 | Burnett | 166/273 X |
| 3,854,532 | 12/1974 | Braden, Jr. | 166/273 X |
| 3,856,086 | 12/1974 | Braden, Jr. | 166/273 X |
| 4,136,738 | 1/1979 | Haynes, Jr. et al. | 166/273 |
| 4,182,416 | 1/1980 | Trantham et al. | 166/263 |

*Primary Examiner*—George A. Suchfield
*Attorney, Agent, or Firm*—Beveridge, DeGrandi & Kline

[57] ABSTRACT

This invention relates to a method of enhancing oil recovery from an underground reservoir containing oil. A gas which is miscible with oil at the temperature and pressure of injection is injected into the reservoir to displace oil. Injection is carried out in such a way as to make sure that a mixing zone is formed in the reservoir such that each fluid introduced is miscible with the fluid immediately preceding it and the fluid immediately following it. This is done by injecting small slugs of fluid miscible with, but different in composition from, the fluid adjacent to the perforated zone of the well. The injection of each slug is followed by a shut-in period to permit a mixing zone to establish itself.

9 Claims, 9 Drawing Figures

ENHANCED OIL RECOVERY BY A MISCIBILITY ENHANCING PROCESS

CROSS REFERENCE TO RELATED APPLICATIONS

This application is a continuation-in-part of U.S. patent application Ser. No. 192,563, filed Sept. 30, 1980, now abandoned.

This invention relates to the recovery of oil from an underground reservoir by an enhanced recovery process.

BACKGROUND OF THE INVENTION

It is generally known that oils from underground reservoirs can be recovered by the injection of fluids which displace such oils. The recovery (displacing) fluid is injected into the reservoirs through one or more injection wells, and the oil is recovered either through separate production wells or through production zones in the injection well which are virtually separated from the injection zones.

Generally, the fluids which are used to displace oils can be divided into three catagories, namely, immiscible, directly miscible and conditionally miscible fluids.

Immiscible displacing fluids, such as water or dry gas are those which form a separate phase from the oils in the formation at the temperatures and pressures encountered there. Such fluids are usually relatively ineffective in recovering oils. They displace a portion of the oil from the zone (known as the "pay zone") in the formation where the oil accumulates, but the portion displaced is usually relatively small, because much of the oil is left in the pores of the reservoir rock by the interfacial forces that exist between the immiscible fluids.

Directly miscible displacing agents (for example, liquified petroleum gases, called "LPG" and consisting primarily of propane and butane) are recovery agents which, at the temperatures and pressures of the pay zones are present as a single phase with the oil and therefore are completely miscible on first contact. Since interfacial forces are absent, such agents are more efficient than immiscible displacing agents in recovering reservoir oil, providing that fingering does not result in early breakthrough of solvent.

A third class of agents, namely conditionally miscible fluids, is also known. Examples of such recovery agents are enriched natural gas, gas plant or refinery ends, flue gas or their mixtures, carbon dioxide, and at high pressure, nitrogen, methane or natural gas. Such recovery agents are not miscible on first contact with the reservoir oils at the temperatures and pressures normally found in the reservoir, but can become miscible or nearly miscible during injection at high pressures and by an interchange of components with the reservoir oil. This process gives recoveries higher than the immiscible process but not as high as the directly miscible process.

Because of the higher recoveries obtainable with directly miscible recovery agents as opposed to conditionally miscible or immiscible ones, it would naturally be preferable to use directly miscible recovery agents on a continuous injection basis. However, all the directly miscible recovery agents are more expensive and contain more energy per reservoir barrel than the immiscible or conditionally miscible agents, so it would be costly to inject large quantities. Some of the expense can be reduced by injecting only a small bank of the directly miscible recovery fluid and by "chasing" the miscible fluid from the formation with cheaper displacing agents, such as methane, carbon dioxide or natural gas, nitrogen, or their mixtures. However, such chasing operations have a significant cost in themselves and become inefficient in cases where the growth of long finger-like projections of solvent known as "fingering" can cause the chase gas to directly contact the oil, resulting in an inefficient immiscible displacement of oil.

U.S. Pat. No. 2,867,277 of Weinaug teaches the injection of a mixture of petroleum and a hydrocarbon displacing material followed by injection of the displacing material alone. The purpose of the injection of the mixture is to form a transition zone between the petroleum and the hydrocarbon displacing material. Preferably, displacing materials are used in sequence. A transition zone is formed between each displacing material and the one which follows it, by injecting a mixture of the two fluids.

The use of a mixture of fluids which is close in viscosity to the reservoir oil is very expensive in today's economic climate, as such mixtures involve fluids of high economic value. Accordingly, the Weinaug process is too expensive for use.

Accordingly, it is an object of the invention to provide a way of creating initial miscibility of a conditionally miscible recovery agent without the use of large amounts of expensive recovery agents and without the use of extremely high pressures and to avoid or minimize and rectify the problem of fingering.

According to the invention, the injection process is started by introducing into the well a small slug of a fluid (hereinafter called "adapting fluid") which is fully miscible with the reservoir oil, and which is miscible with the conditionally miscible recovery agent (which will usually be a gas), over a wide range of concentrations (e.g., from about 20% adapting fluid-80% gas to 80% adapting fluid-20% gas). The adapting fluid should be a fluid which is directly miscible with the reservoir oil on a first contact basis at the temperatures and pressures to be used, and which is miscible over a wide range of concentrations (from about 80-20%) with a conditionally miscible fluid to be used. Although such miscible fluids include relatively expensive recovery agents, natural gas liquids (NGL), liquid petroleum gas (LPG), and hexane, heptane and higher hydrocarbon fractions, as well as acetone and lower alcohols, these can have appreciable concentrations of $C_1$, or $C_2$ hydrocarbon added to reduce cost, provided miscibility is maintained.

A particularly preferred adapting fluid is a stream of plant gas or refinery by-products including sufficient hydrocarbons of $C_2$ and greater chain lengths, so as to be miscible with the reservoir oil. Such streams of gas plant or refinery by-products can also include significant mole fractions of $C_1$ hydrocarbon, nitrogen, sulphur dioxide and hydrogen sulphide, provided there are enough hydrocarbons present to ensure miscibility with the reservoir oil on a first contact basis.

The adapting fluid is followed by several slugs, in which the concentrations of adapting fluid are descreased and increasing concentrations are included of a fluid miscible with the adapting fluid, but which is only conditionally miscible with the reservoir oils. Such fluids are sometimes also known as multiple contact miscible fluids. Preferred conditionally miscible fluids are enriched natural gas, gas plant or refinery light ends, carbon dioxide and nitrogen, natural gas, ethane and/or their mixtures. It is particularly preferred to use off-gas from oil refining, which is frequently available at very low cost in oil producing regions. Such off-gas may typically have methane as its largest single component, small amounts of $C_2$-$C_4$ hydrocarbons, and some nitrogen, sulphur dioxide and hydrogen sulphide. Another multiple contact miscible fluid can be flue gas from different kinds of plants and would contain nitrogen, nitrogen, oxides and carbon dioxide. Still another multiple contact miscible fluid can be pure carbon dioxide or a gas consisting mostly of carbon dioxide. Other suitable fluids will be obvious to one skilled in the art.

The slug of adapting fluid injected need not be large enough to have any significant effect at driving oil from the reservoir towards a production well, and can be as small as 500 $m^3$ at reservoir conditions. If injection takes place through several wells, the slug injected at each well should be at least 500 $m^3$ at reservoir conditions. There is no fixed upper limit to the size of the slug of adapting fluid, but the adapting fluid is generally more expensive than the conditionally miscible recovery fluid so that slugs of over 15% of the pore volume at the reservoir conditions are not usually used. Generally, the total volume of all slugs used, at the reservoir conditions, will not exceed 35% to 40% of the hydrocarbon pore volume of the reservoir.

The viscosity of the first slug of adapting fluid need not be similar to that of the oil in the reservoir, and likewise the viscosity of each slug need not be similar to that of the slug before it. However, the optimum period of shut-in becomes longer when the viscosity difference between slugs or between the first slug and the reservoir oil is greater.

Following injection of the slug, the well is shut-in for a period of at least two days, and preferably of about two weeks or longer, depending on the reservoir characteristics and the nature of the fluids. "Shut-in" as used in this disclosure is a period of time in which no injection of fluid is passed into the injector well or wells. However, it can include a "pulsed" shut-in, where short periods of injection interrupt the shut-in period, or where shut-in of one injection well is alternated with shut-in of another injection well. A pulsed shut-in of this sort may of certain cases aid mixing of the injected fluid with the fluids already in the well. During the period of shut-in, the fluid exchanges components with the reservoir oil, forming a mixing zone in the volume of the reservoir immediately surrounding the perforated level of the well. After the period of shut-in, a second slug, of mixed adapting fluid and the conditionally miscible recovery fluid, is introduced into the well followed by a period of shut-in. Suitably the second slug is formed from 80–50% adapting fluid and 50–20% conditionally miscible recovery fluid totalling 100%. This slug, which again may be as small as 500 $m^3$ at reservoir conditions, is followed by a further period of shut-in of at least two days. A third slug, having a lesser percentage of adapting fluid and greater percentage of conditionally miscible recovery fluid than the second slug is injected after the period of shut-in. Suitably the third slug may have 60–30% adapting fluid and 70–40% conditionally miscible fluid, totalling 100%, provided the percentages chosen are such that the percentage of adapting fluid is less than that in the previous slug, and the percentage of conditionally miscible recovery fluid is greater than that in the preceding slug. Each slug has a volume of 500 $m^3$ at the reservoir conditions. A fourth slug may also be injected into the well if desired after the period of shut-in. This slug will have a larger percentage of conditionally miscible fluid and a smaller percentage of adapting fluid than the third slug, i.e., from 40–20% adapting fluid and 60–80% conditionally miscible fluid. Again it is followed by a period of at least two days of shut-in. Generally, the use of any slug which is over 10% to 15% of the hydrocarbon pore volume at the reservoir conditions is not preferred, because of the cost of the adapting fluid.

After the shut-in period following injection of the last slug, injection of the conditionally miscible fluid is started. The oil is recovered, either from a production well separate from the injection well, or from a zone which is vertically separated from the injection zone on the well used for injection.

When the compositions of the fluids are designed correctly, then the conditionally miscible fluid injected into the well will be completely miscible with the slug immediately adjacent to the perforated zone of the well. Thus, there is a transition zone formed by the slugs of gradually increasing concentration of conditionally miscible fluid extending from the reservoir oil to the last slug injected.

The periods of shut-in are essential to this process as they give time for a transition zone to establish itself between each slug and the slug (or reservoir oil) which it contacts as it spreads away from the well and prevents the growth of fingers. The periods of shut-in needs not be very long, provided they are sufficiently long for an adequate transition zone to form.

It has been found that periods of about two weeks will work well. Depending on the size of the slug and the properties of the reservoir rock and fluids, much longer periods of shut-in may be detrimental, as the slug could be consumed in time by diffusion into the surrounding oil and gas zones. Obviously it is uneconomical in most circumstances to have an unduly long period of shut-in, because it is usually desirable to begin recovery from the field as soon as possible. Therefore, a cumulative shut-in period of more than approximately four months between the first slug and the conditionally miscible fluid is not preferred. The delays by shut-in times can be offset by higher initial injection rates during the solvent bank placement so that the average voidage replacement is kept at some planned level.

The production wells may be shut-in or may continue to produce during the shut-in period of the injection wells, subject to the constraint that the pressure at the displacement front is maintained above the minimum miscibility pressure. This may be insured by injecting the solvent at injected rates above those required for voidage displacement before shut-in.

In preferred embodiments, only a limited volume of the conditionally miscible fluid will be used and a change will be made of injection of a cheaper chase fluid such as natural gas, flue gas or nitrogen or their mixtures. When such preferred embodiments are used, slugs of mixtures of the conditionally miscible fluid and the chase fluid will be injected, with shut-in periods between slugs to aid in the maintenance of a uniform displacement front.

In order to facilitate the spreading of the injected solvent throughout the oil zone and also to decrease the time that it takes to inject the solvent, it is usually desirable to use a maximum number of wells for solvent injection purposes. A suitable way to do this is to utilize all available wells for solvent injection purposes, whether they are injectors, producers or observation wells in normal operations and irrespective of whether they are drilled vertically or horizontally. If a well is normally used as a producer, it can be recompleted dually; or by using the appropriate equipment so that the upper part of the oil zone is used for solvent injection, while the well could be continue to produce from the lower part of the oil zone or the converse.

Once placement of the solvent has been achieved in the designed manner, the wells can be converted into conventional producers, injectors or observation wells. The use of the maximum number of wells whether drilled vertically or horizontally for solvent injection is especially important in vertical miscible displacement processes.

DETAILED DESCRIPTION OF THE INVENTION

Figure 1C:
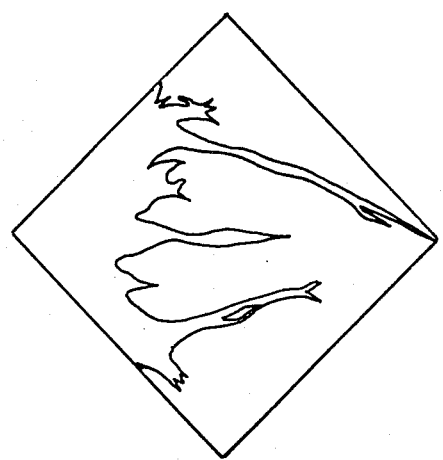
FIGS. 1a, 1b, 1c, 2a, 2b, 2c, and 3a, 3b, and 3c are drawings made from photographs showing the results of experimental verification on a laboratory scale, of the process of the invention.

As described a series of slugs are placed down the well, separated by period of shut-in.

The first slug which is placed down the well should be fully miscible with the reservoir oil on first contact. Typically the first slug will be composed only of adapting fluid, but it is possible to use slugs having 80% or more of the adapting fluid, with the balance being the conditionally miscible fluid, or known well treating agents, provided that the slug placed down the well is fully miscible with the reservoir oil on first contact.

The second slug which is placed down the well must be miscible with the first slug, and with the third slug to follow it. It will comprise from 90–50% of the adapting fluid, with the balance being conditionally miscible fluid. Typically, the composition in the third slug will be from 60–30% of the adapting fluid, with the balance being the conditionally miscible fluid, although small amount of well treating agents may be added if desired. When a fourth slug is used, it will again have less of the adapting fluid, and more of the conditionally miscible fluid than the third slug. Between each two slugs being injected, a period of shut-in, as previously discussed, is maintained. After the injection of the final slug, and a further period of shut-in, the conditionally miscible fluid is injected on a continuous basis and the oil recovery may proceed. If desired, however, the conditionally miscible fluid can then be chased from the well by a chase fluid of lesser value, such as water or dry gas in a continuous or alternating manner. Shut-in times and compositional changes may also be used between the chase fluid and the conditionally miscible fluid.

As an illustration of the invention, an example is given below, but it should be understood that the invention is in no way restricted to the particulars of this example; the process described in this invention can be applied utilizing other slug compositions, slug volumes and shut-in times.

For the example chosen here, the adapting fluid, i.e. the first injected fluid, is identical to the actual composition of the miscible fluid which is currently being injected into one of the Rainbow Keg River pools being operated by Canterra Energy Ltd. All percentages are on molar basis. The following, displacing fluid, i.e. the multiple contact or the conditionally miscible fluid, is obtained from the directly miscible agent but with all components higher than $C_2$ having been removed. Thus, the adapting fluid and the conditionally miscible fluids have a molar composition as follows (Table I):

TABLE I

THE COMPOSITIONS OF THE DIRECTLY MISCIBLE FLUID AND THE CONDITIONALLY MISCIBLE FLUID

| Component | Directly Miscible Fluid (Adapting Fluid or First Fluid) Mole Fraction | Conditionally Miscible Fluid (Recovery Agent or Recovery Fluid) Mole Fraction |
|---|---|---|
| $CO_2$ | 0.0016 | 0.0032 |
| $N_2$ | 0.0041 | 0.0083 |
| $C_1$ | 0.2792 | 0.5670 |
| $C_2$ | 0.2075 | 0.4215 |
| $C_3$ | 0.2522 | |
| $iC_4$ | 0.0479 | |
| $nC_4$ | 0.1144 | |
| $iC_5$ | 0.0351 | |
| $nC_5$ | 0.0313 | |
| $C_6$ | 0.0197 | |
| $C_{7+}$ | 0.0070 | |
| | 1.0000 | 1.0000 |

It should be noted that the molar composition of the conditionally miscible fluid has been calculated on the basis of the $CO_2$, $N_2$, $C_1$ and $C_2$ component content of the directly miscible fluid. In the above example, between the first directly miscible slug and the final conditionally miscible fluid, three additional slugs of intermediate compositions will be injected, each having a volume of 20,000 $m^3$ at reservoir conditions and each being followed by a shut-in period of 14 days. The entire sequence of injection will be:

First slug—20,000 $m^3$ at reservoir conditions of directly miscible fluid followed by a 14 day shut-in period.

Second slug—20,000 $m^3$ at reservoir conditions of a mixture of 75% directly miscible fluid and 25% conditionally miscible fluid, followed by a shut-in period of 14 days.

Third slug—20,000 $m^3$ at reservoir conditions of a mixture of 50% directly miscible fluid and 50% conditionally miscible fluid, followed by a shut-in period of 14 days.

Fourth slug—20,000 $m^3$ at reservoir conditions of a mixture of 25% directly miscible fluid and 75% conditionally miscible fluid, followed by a shut-in period of 14 days, and in turn, followed by the continuous injection of the conditionally miscible fluid without further shutting-in, except when it is desired to form a transition zone between the conditionally miscible fluid and a cheaper chase fluid as mentioned previously.

The molar compositions of the intermediate slugs can be easily calculated by using standard mixing rules, reflecting the relative percentages of each fluid in the mixture. Consequently, the molar percent of any component i (i representing $CO_2$, $N_2$, $C_1$ to $C_{7+}$) for each mixture slug is calculated from the formula:

2nd slug: $x_i = (0.75)x_{i,}l + (0.25)x_{i,}f$

3rd slug: $x_i = (0.50)x_{i,}l + (0.50)x_{i,}f$

4th slug: $x_i = (0.25)x_{i,}l + (0.75)x_{i,}f$ in the above formulas, $x_{i,}l$ stands for the molar concentration of any component i in the first fluid, that is, in the directly miscible fluid and $x_{i,}f$ stands for the molar concentration of the same component i in the following fluid, in this case conditionally miscible fluid as shown in Table 1. The average mole weight, M of any of the injected fluids is calculated using the relationship:

$$M_{avg} = \sum_{i=1}^{n} x_i M_i$$

where:
  $n$ = the number of components;
  $x_i$ = mole fraction of the i th component in the mixture;
  $M_i$ = molar weight of the i th component.

Using the foregoing equations, the composition and average molar weights of each injected fluid were calculated and are given in Table 2. The compositions given in Table 2 represent only one example of the slugs of fluids to be injected. Specific formulations differing from these can be worked out by fundamental mixing calculations similar to the foregoing, or by laboratory measurements by anyone familiar with the art of miscible flooding.

TABLE 2

MOLAR COMPOSITIONS AND AVERAGE MOLAR WEIGHTS OF THE INJECTED FLUIDS

| i th Component | Molar Weight | Composition, Mole Fraction | | | | |
|---|---|---|---|---|---|---|
| | | Directly Miscible Fluid 1st Slug | 2nd Slug | 3rd Slug | 4th Slug | Conditionally Miscible Fluid |
| $CO_2$ | 44.010 | 0.0016 | 0.0020 | 0.0024 | 0.0028 | 0.0032 |
| $N_2$ | 28.013 | 0.0041 | 0.0052 | 0.0062 | 0.0073 | 0.0083 |
| $C_1$ | 16.042 | 0.2792 | 0.3511 | 0.4231 | 0.4950 | 0.5670 |
| $C_2$ | 30.070 | 0.2075 | 0.2610 | 0.3145 | 0.3680 | 0.4215 |
| $C_3$ | 44.097 | 0.2522 | 0.1892 | 0.1261 | 0.0631 | |
| $iC_4$ | 58.124 | 0.0479 | 0.0359 | 0.0239 | 0.0120 | |
| $nC_4$ | 58.124 | 0.1144 | 0.0858 | 0.0572 | 0.0286 | |
| $iC_5$ | 72.151 | 0.0351 | 0.0263 | 0.0176 | 0.0088 | |
| $nC_5$ | 72.151 | 0.0313 | 0.0235 | 0.0156 | 0.0078 | |
| $C_6$ | 86.178 | 0.0197 | 0.0148 | 0.0099 | 0.0049 | |
| $C_{7+}$ | 114.232 | 0.0070 | 0.0052 | 0.0035 | 0.0017 | |
| | | 1.0000 | 1.0000 | 1.0000 | 1.0000 | 1.0000 |
| Average Molar Wt. | | 38.747 | 34.594 | 30.447 | 26.291 | 22.144 |

*Properties of $C_8$ are used for $C_{7+}$

The mole fraction of each fluid present in the mixture at the beginning of injection, and the rate of change of the composition of the mixture, will be determined for the particular pay zone, having regard to the nature of the formation forming such pay zone, including the heterogeneity of the pay zone, the presence of fractures and vugs therein, the viscosity of the oil in the formation, and the degree of enrichment and viscosity of the gas being used. The criterion used to select the composition of the mixture is that each slug should be fully miscible in the reservoir with the slugs which precede and succeed it. The miscibility of the mixtures in the reservoir at temperatures and pressures existing thereof, can be approximately determined according to a method described by Benham et al in *The Transactions of the A.I.M.E.*, (1960) Volume 21, page 229. It is also possible, and in fact desirable, to do experimental measurements on miscibility by using laboratory scale experiments which are known as the "slim tube method." This method uses a tube, usually helical or vertical in form, packed with glass beads, sand or materials from the formation to simulate the porous medium in the reservoir under consideration. The tube is saturated with the fluid which is to be displaced and a proposed mixture is introduced at the reservoir temperature and at a pressure chosen as the injection pressure for the particular reservoir. Whether or not the fluids are fully miscible may be determined by a visual examination (to see that there are no obvious phase or colour changes in a visual cell placed at the end of the tube) or by a consideration of parameters such as the amount of recovery of oil which has been placed in the tube, produced fluid composition, specific gravity of the produced fluids, refractive index or other suitable parameter. Generally, it is considered that the fluids have been miscible, at the particular temperatures and pressures present, if there is a minimum of 90% recovery of the fluid being displaced by the time that an amount of displacing mixture equivalent to 1.2 times the pore volume of the contents of the tube has been injected. This is a known method of measuring miscibility and will aid in selecting consecutive slug compositions. Other known methods can, of course, be used to measure miscibility as well.

The size of the slugs of fluid does not completely depend on the size of the pore volume of the reservoir since the slugs are only intended to initiate a mixing zone in the reservoir. The shut-in period is an essential feature in this invention since during shut-in diffusion and gravity segregation take place, facilitating the development of a mixing zone of the kind which will achieve miscibility throughout and inhibit the growth of fingers.

It will be understood by one skilled in the art that the recovery process described can best be carried out in a vertical direction, either in a downward or an upward direction and at any level of the reservoir or in a horizontal direction.

The experimental verification of the process, as illustrated in the drawings, will now be described.

A series of experimental fluid displacement tests were performed to illustrate the processes involved. Photographs of the various runs were taken as documentation and were used to prepare the drawings. These photographs and the drawings from them demonstrate the physical phenomena involved and are not intended to yield scaling information for an actual operation. Each test was conducted using two flat, evenly spaced pieces of plate glass placed together in a vertical position and resting on a corner rather than one of the sides.

Each of the glass plates was approximately twelve inches square and had one-quarter inch diameter holes drilled in diagonally opposite corners. When the plates were placed together, the apparatus had holes in all four corners. These square of plate glass were separated by a shim-stock material one inch wide and 0.0087 inch thick. The shim-shock and the glass plates formed a cell with dimensions 10.5"×10.5"×0.0087" and had a volume of 15.7 cc. The strip of shim-stock was cut away at the corners to allow communication from the outside through the holes in the glass. The outer edge of the assembly was secured with clamps spaced evenly about the perimeter. Conduits were connected to each of the holes in the glass plate to facilitate injection and production capabilities. Injections were conducted at constant rates, using a pump designed for liquid chromatography. Produced streams were collected in a burette whilst maintaining a back pressure of 5 cm. of water above atmospheric pressure. Such an apparatus is commonly referred to as a Hele-Shaw Model.

In the tests, the reservoir was filled with a viscous fluid, which was displaced by a less viscous fluid or a combination of less viscous fluids. The fluids were chosen so that the ratio of their viscosities would approximate the ratio of the viscosity of reservoir oil to a conditionally miscible displacing fluid. Properties of the fluids used can be found in Table 3.

TABLE 3
SUMMARY OF FLUID PROPERTIES

| Fluid Type | Description | Viscosity (cp) | Density (g/cc) | PH | Colour |
|---|---|---|---|---|---|
| Displacing fluid | 0.23 N HCl saturated with thymol blue | 0.98 | 1.032 | 1.64 | clear |
| Displaced fluid | 600 cc glycerol + 150 cc $H_2O$ + 1.5 g NaOH + 0.2 g thymol blue | 58.8 | 1.225 | 11.4 | blue |

Several test runs were made with this apparatus to compare the fingering which occurs at the transition between the displaced fluid (which simulates reservoir oil) and the displacing fluid (which simulates the first slug placed into contact with the reservoir oil). Alternately, the results can be viewed as reflecting the transition between an early slug and the one immediately following it. In each run, the apparatus was arranged in a vertical orientation, with injection of displacing fluid into the topmost corner and production of displaced fluid from the bottom, diagonally opposite corner. The fluids were colored differently so that the mixing zone between them could be seen.

Run 1

The first run demonstrated the injection of a slug without any shut-in period. The run continued until the displacing fluid "broke through" from the bottom, production part. The total yield of displaced fluid (which represents the production of the well) was then measured at time of breakthrough.

Run 1 was carried out at a flow rate of 2 $cm^3$/min. Breakthrough occurred at 2.50 minutes after commencement. The recovery of displaced fluid at breakthrough was 4.5 $cm^3$.

Figure 1B:
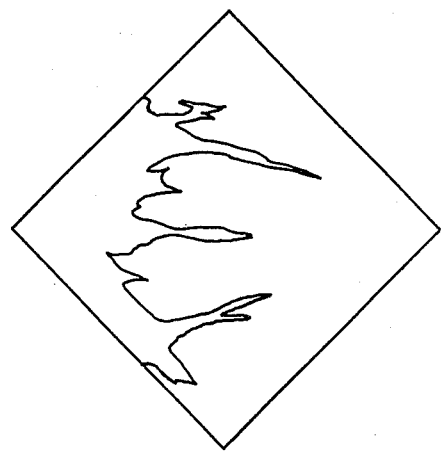
Figure 1A:
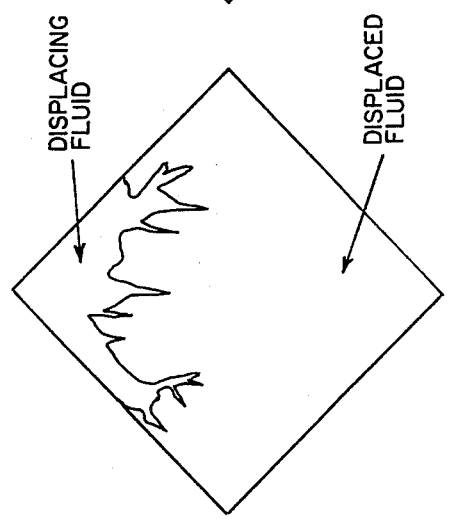

FIG. 1a illustrates the interface (i.e., mixing zone) between the displaced and displacing fluid 1.5 minutes after the start of the run. FIG. 1b illustrates this interface at about 2.4 minutes. FIG. 1c illustrates the interface at breakthrough.

Run 2

The second run repeated the conditions of the first run, except that the run was interrupted after 1.5 minutes by shut-in of 1.5 minutes. After shut-in, the rate of injection was returned to 2.0 $cm^3$/min., although inertial effects caused this rate to fluctuate between 1.3 $cm^3$/min. and 2.3 $cm^3$/min.

Figure 2C:
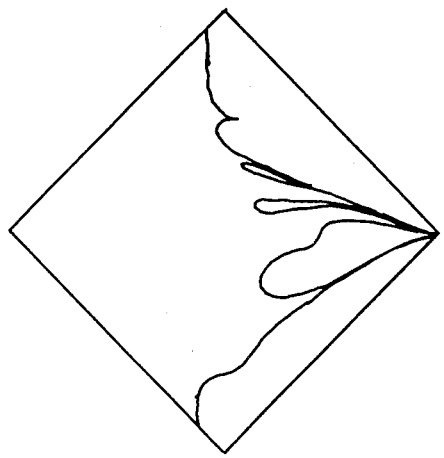
Figure 2B:
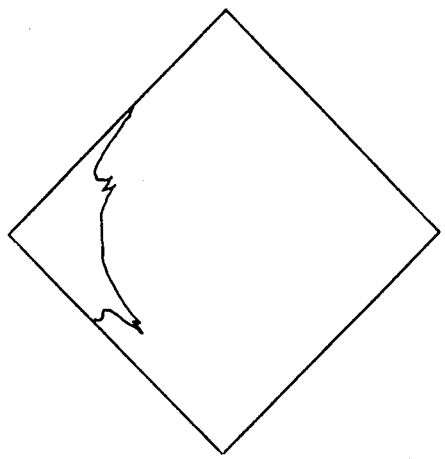
Figure 2A:
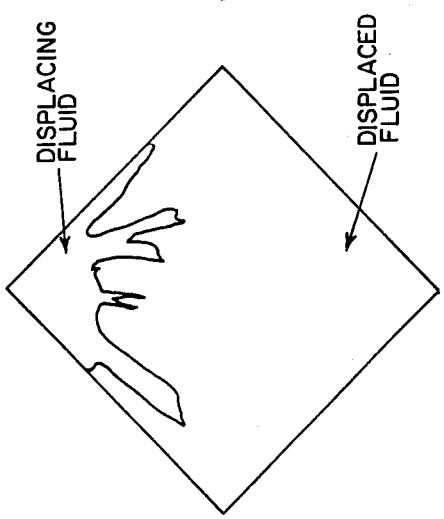

Breakthrough occurred at 5.40 minutes from the start of the run. Recovery was 6.2 $cm^3$ of displaced fluid, a much larger recovery than occurred with Run 1. FIG. 2a shows the interface at the commencement of the shut-in. FIG. 2b shows the mixing zone at the resumption of injection after shut-in. FIG. 2c shows the interface at breakthrough. It will be seen that there is considerably reduced fingering after the shut-in, resulting in a higher yield to breakthrough.

Run 3

This run demonstrates that the longer time span for recovery because of shut-in case be compensated by higher injection and production rates, with satisfactory effects.

The run was carried out as follows:

| Time | Flow Rate |
|---|---|
| 0 to 0.5 minutes | 3.2 $cm^3$/min. |
| 0.5 to 1.5 minutes | 0 (shut-in) |
| 1.5 to 2.0 minutes | 2.8 $cm^3$/min. |
| 2.0 to 2.5 minutes | 0 (shut-in) |
| 2.5 to 3.0 minutes | 2.6 $cm^3$/min. |
| 3.0 to 4.0 minutes | 0 (shut-in) |
| 4.0 minutes to breakthrough (6.20 minutes) | 2.0 $cm^3$/min. |
| Recovery at breakthrough was | 7.0 $cm^3$ |

Figure 3C:
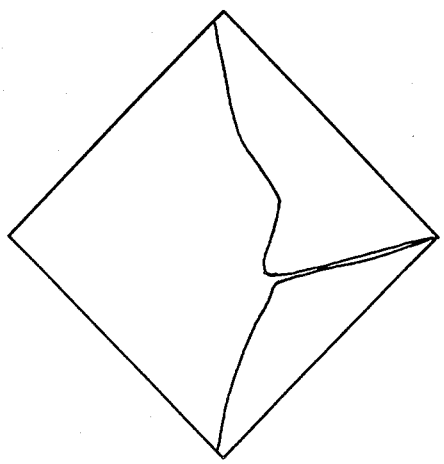
Figure 3B:
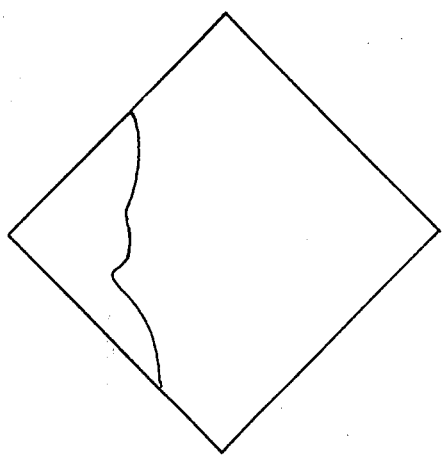
Figure 3A:
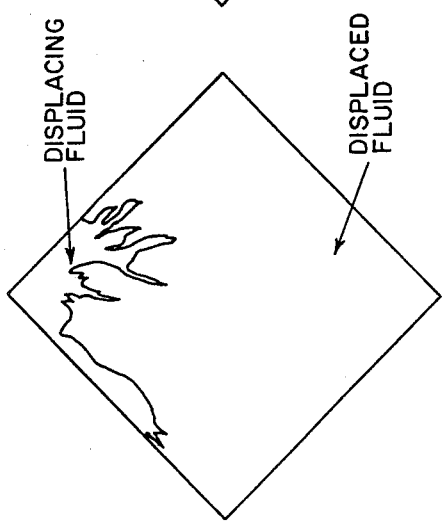

FIG. 3a shows the mixing zone between the displaced and displacing fluids at 0.5 minutes after the start of the run. FIG. 3b shows the mixing zone at 5.00 minutes after start of the run, and FIG. 3c shows the mixing zone at breakthrough.

Run 3 also shows that, if desired, injection of a single slug can be interrupted by frequent shut in periods, in addition to having shut in periods between slugs. This procedure increases the benefits of the invention, as shown by the increased yield of displaced fluid.

Although the test runs discussed took place in a few minutes, this is a function of the size of the test apparatus. For any reservoir of reasonable size, shut in periods of two days or more, and preferably about two weeks, are necessary.

Although the process has been described as being applied to a recovery process using more than one well, it will be obvious that it can be applied to a recovery process using a single well, where the injection takes place at one level, and the production (recovery) at another level.

The process can also be used to stimulate a single well or group of wells. In the case of well stimulation, production (recovery) of the oil would commence after the injection of fluids and the shut in period according to the invention have been completed.

The process as described herein can be applied to conventional as well as heavy oil reservoirs and further may be used in volatile oil and gas condensate reservoirs. In the case of volatile oil and gas condensate pools, application of this process can maintain pressure, thereby preventing retrograde condensation of the gases in the reservoir.

This process can be applied to enhance the recovery in oil reservoirs previously flooded with any agent, such as: miscible agents, water, chemically treated water, gas or with a combination of these.

In designing such a project for a particular reservoir, it is understood that all of the normal laboratory, numerical simulation and testing procedures will be conducted—including asphaltene deposition investigations.

It is understood that the foregoing description has illustrated particular embodiments of the invention, and is intended to be illustrative, but not limiting. Other embodiments will occur to a person skilled in the art.

Accordingly, it is intended that the protection granted hereby shall be limited only by the scope of the appended claims.

What is claimed is:

1. A process for enhancing oil recovery from an underground oil reservoir in which a conditionally miscible recovery fluid injected through at least one injection well displaces oil from said reservoir to a production well which comprises:
   (a) injecting into said reservoir through said at least one injection well an initial slug comprised of a first fluid which is fully miscible with the reservoir oil and which is miscible with said conditionally miscible recovery fluid over a range of concentrations from about 20% first fluid—80% recovery fluid to about 80% first fluid—20% recovery fluid, the viscosity difference between said reservoir oil and the first fluid being sufficiently high for fingering to occur in the absence of inhibition of said fingering;
   (b) then shutting in said at least one injection well for at least two days to establish a transition zone between the reservoir oil and the initial slug to inhibit said fingering;
   (c) thereafter injecting through said at least one injection well a plurality of additional slugs each comprising a mixture of the first fluid and the recovery fluid, the concentration of first fluid progressively decreasing from the first to the last of said plurality of additional slugs, the last of said slugs being completely miscible with the recovery fluid; and then
   (d) injecting through said at least one injection well said recovery fluid to recover oil from said production well.

2. A process as in claim 1 in which the injection well is shut in for at least two days to establish a transition zone to inhibit fingering following the injection of each slug of said plurality of slugs.

3. A process as claimed in either of claims 1 or 2, including the step of recovering oil from production well located in said same oil reservoir during or following the process of either of said claims.

4. A process as claimed in any of claims 1 or 2 in which each said period of shut in is at least 2 weeks in length.

5. A process as claimed in any of claim 1 or 2 in which the first fluid is a plant gas or refinery byproduct gas including $C_1$ hydrocarbon, and sufficient $C_2$ and higher hydrocarbons so that it is fully miscible with the reservoir oil at the temperatures and pressures found in the reservoir.

6. A process as claimed in any of claims 1 or 2, in which the conditionally miscible recovery fluid is selected from the group consisting of enriched natural gas, gas plant or refinery light ends, carbon dioxide, nitrogen, natural gas, ethane, or off-gas from oil refinery, alone or in admixture.

7. A process as claimed in either of claims 1 or 2, in which the production well is shut-in for the same period as the injection well.

8. A process as claimed in claim 1, in which all wells connecting to the said reservoir are used as injection wells for the process of claim 1, and after the performance of the process of said claim, at least one of such wells is used as a production well to recover oil from said reservoir.

9. A process as claimed in claim 1 in which said injection well comprises in addition to an injection zone, a production zone, from which oil is recovered, one of said injection and production zones being located in the upper portion of the oil bearing zone of said reservoir through which said well passes and the other being located in the lower portion of the oil bearing zone of said reservoir through which said well passes.

* * * * *